United States Patent [19]

McComas et al.

[11] 4,273,824

[45] Jun. 16, 1981

[54] CERAMIC FACED STRUCTURES AND METHODS FOR MANUFACTURE THEREOF

[75] Inventors: Charles C. McComas, Stuart; Larry S. Sokol, West Palm Beach, both of Fla.

[73] Assignee: United Technologies Corporation, Hartford, Conn.

[21] Appl. No.: 38,042

[22] Filed: May 11, 1979

[51] Int. Cl.³ .................. B32B 15/18; F01D 11/08; F04D 29/08
[52] U.S. Cl. .................. 428/256; 415/174; 427/34; 427/52; 427/89; 427/250; 427/328; 427/427; 427/436; 428/550; 428/654; 428/661; 428/937; 428/472
[58] Field of Search .............. 427/34, 38, 52, 89, 427/250, 328, 427, 436; 428/469, 472, 256, 550, 654, 661, 937; 415/170 R, 174

[56] References Cited

U.S. PATENT DOCUMENTS

| | | | |
|---|---|---|---|
| 2,756,200 | 7/1956 | Houck | 427/427 X |
| 3,427,698 | 2/1969 | Guzewicz | 427/34 X |
| 3,817,719 | 6/1974 | Schilke et al. | 415/174 X |
| 3,927,223 | 12/1975 | Takabatake et al. | 427/34 |
| 3,964,877 | 6/1976 | Bessen et al. | 415/174 X |
| 4,055,705 | 10/1977 | Stecura et al. | 427/34 X |
| 4,059,712 | 11/1977 | Bothwell | 428/256 X |
| 4,075,364 | 2/1978 | Panzera | 427/34 |
| 4,076,888 | 2/1978 | Perugini et al. | 427/34 X |
| 4,080,204 | 3/1978 | Panzera | 415/174 |
| 4,109,031 | 8/1978 | Marscher | 428/336 X |
| 4,139,376 | 2/1979 | Erickson et al. | 415/174 |
| 4,141,802 | 2/1979 | Duparque et al. | 427/34 X |
| 4,152,223 | 5/1979 | Wallace et al. | 427/34 X |
| 4,171,393 | 10/1979 | Donley et al. | 427/436 X |

Primary Examiner—Harold Ansher
Attorney, Agent, or Firm—Robert C. Walker

[57] ABSTRACT

A method of adhering a ceramic facing material to an underlying substrate is disclosed. Substrates to which the concepts apply include unsupported low modulus, porous wire pads as well as low modulus, porous wire pads backed by a solid metallic form. The ceramic application techniques employed are centered around the impregnation of the regions of the pad to be ceramic coated with an underlayment coating, such as MCrAlY material, wherein the designation "M" stands for at least one of the elements from the iron cobalt and nickel group. Deep penetration of the underlayment material into the pad is achieved with a high velocity, spraying process. Ceramic material is applied over the underlayment material by conventional spraying techniques.

Articles of manufacture which are suited to fabrication in accordance with the concepts disclosed herein include, but are not limited to, outer air seals, combustion chambers, and airfoils of gas turbine engines.

28 Claims, 10 Drawing Figures

MAG: 50X

MAG: 200X

MAG: 50X

MAG: 200X

CERAMIC FACED STRUCTURES AND METHODS FOR MANUFACTURE THEREOF

BACKGROUND OF THE INVENTION

1. Field of the Invention

This invention relates to ceramic materials and more particularly to the application of a ceramic facing material to an underlying substrate in the manufacture of high temperature capability articles.

2. Description of the Prior Art

Ceramic materials in general are known to be effective thermal insulators in gas turbine environments and are currently utilized as coating materials for metallic substrates in high temperature environments. Such ceramics prevent unacceptable deterioration of the metallic forms to which they are adhered. Metallic and ceramic materials are not wholly compatible, however, as the large difference in coefficients of thermal expansion between the two materials makes adherence of the ceramic to the metal difficult. Moreover, subsequent thermal cycling of the finished part in the intended environment often causes cracking and spalling of the ceramic from the metal. Such problems are particularly severe where depths of coating in excess of a very few thousandths of an inch are desired.

A dominant portion of the prior art in this field is being developed in the gas turbine engine industry although the concepts have wider applicability. Representative components which hold potential for improved performance and durability through the incorporation of ceramic materials include combustion chambers, airfoils and outer air seals.

The construction of outer air seals, in particular, has received significant attention in the prior art and effective embodiments of such seals are continually sought. In an axial flow gas turbine engine, rows of rotor blades in both the compression and turbine sections of the engine extend radially outwardly on the rotor assembly across the flow path for working medium gases. An outer air seal affixed to the stator assembly circumscribes the tips of the blades of each blade row to inhibit the leakage of working medium gases over the tips of the blades. Each outer air seal is conventionally formed of a plurality of seal segments disposed in end to end relationship about the engine. The tip opposing surfaces of each segment are commonly formed of an abradable material which enables closely, toleranced initial conditions without destructive interference with the blade tips at transient conditions. Representative abradable seal lands and methods of manufacture are illustrated in U.S. Pat. Nos. 3,817,719 to Schilke et al entitled "High Temperature Abradable Material and Method of Preparing the Same"; 3,879,831 to Rigney et al entitled "Nickel Base High Temperature Abradable Material"; 3,918,925 to McComas entitled "Abradable Seal"; and 3,936,656 to Middleton et al entitled "Method of Affixing an Abradable Metallic Fiber Material to a Metal Substrate".

Notwithstanding the availability of the aforementioned materials and designs, manufacturers of gas turbine components continue to search for yet improved abradable material constructions having adequate durability in hostile environments. Particularly, within the turbine sections of engines where seal materials are exposed to local temperatures which may exceed twenty-five hundred degrees Fahrenheit (2500° F.), material and structure selections having adequate durability are limited. Ceramic faced seals are of prime interest for turbine components.

One ceramic faced seal structure which is adapted to accommodate differences in coefficients of thermal expansion between the ceramic facing material and an underlying metallic substrate is disclosed in U.S. Pat. No. 4,109,031 to Marscher entitled "Stress Relief of Metal-Ceramic Gas Turbine Seals". Graded layers of material in which the relative amounts of metal and ceramic are varied from one hundred percent (100%) metal at the metal interface to one hundred percent (100%) ceramic at the ceramic interface are applied to the metal substrate.

Another type of ceramic faced seal structure is discussed in a paper delivered at the 1976 Joint Fall Meeting of the Basic Science, Electronics and Nuclear Divisions of the American Ceramic Society entitled "Bonding Ceramic Materials to Metallic Substrates for High-Temperature, Low-Weight Applications" and in NASA Technical Memorandum, NASA TM-73852, entitled "Preliminary Study of Cyclic Thermal Shock Resistance of Plasma-Sprayed Zirconium Oxide Turbine Outer Air Seal Shrouds". In accordance with the disclosed systems, a mat of sintered wires joins a ceramic layer to an underlying metallic substrate. The wires form a compliant layer which is capable of accommodating differential thermal expansion between substrate and ceramic layers. In the former structure the ceramic is applied directly to the wire mat. In the latter structure the ceramic is applied to a wire mat over a three to five thousandths of an inch 0.003-0.005 in.) bondcoat.

Although the structures discussed above are known to be highly desirable if adequate durability can be achieved, the structures have yet to achieve full potential, particularly in hostile environment applications.

SUMMARY OF THE INVENTION

A primary aim of the present invention is to provide a ceramic faced structure having good durability in high temperature environments. Secure adhesion of the ceramic to a substructure is sought, and a specific object is to provide a resulting structure having good tolerance of differential thermal expansion between the ceramic material and the substructures.

According to the method of the present invention an MCrAlY underlayment material is impregnated into a low modulus pad of porous material by a high velocity plasma spray process and a ceramic coating is applied over the underlayment material to provide a ceramic faced structure.

According to at least one detailed embodiment of the present method, a solid metal substrate is contoured to the general shape of the desired ceramic facing material; a low modulus, wire pad of near uniform thickness is bonded to the contoured surface of the substrate; the wire pad is impregnated with MCrAlY material by a high velocity plasma spray process to form an underlayment layer; and ceramic facing material is applied to the underlayment layer.

A primary feature of the method of the present invention is the step of applying an underlayment coating of MCRAlY type material to the low modulus, pad prior to the application of the ceramic facing material. In at least one embodiment, the low modulus pad is first bonded to a solid, metallic substrate. The MCrAlY material comprising the underlayment coating is applied by a high velocity, plasma spray process described in co-pending patent application Ser. No. 13,944 filed Feb. 22, 1979. Ceramic coating material is applied over the MCrAlY underlayment.

A principal advantage of the present invention is good adherence of the ceramic material to the underlying substructure. The MCrAlY underlayment material facilitates adhesion of the ceramic material to the porous pad. Deep penetration of the underlayment material into the porous pad is achieved by the high velocity, plasma spray process. In at least one embodiment the underlayment is applied with a reduced temperature, plasma spray process to prevent oxidation of the pad material. The porous pad in embodiments having a solid metallic substrate accommodates differential thermal expansion between the ceramic material and the substrate. In embodiments without a solid substrate, the pad provides a form to which the ceramic is applied. Significant depths of ceramic coating material can be applied to components without detrimental failure of the ceramic facing material during use of a coated component. Sensitivity of the facing material to delamination from the substrate and spalling is reduced.

The foregoing, and other objects, features and advantages of the present invention will become more apparent in the light of the following detailed description of the preferred embodiment thereof as shown in the accompanying drawing.

DETAILED DESCRIPTION

The concepts of the present invention are illustrated with respect to the manufacture of high temperature capability components for gas turbine engines. The concepts are equally applicable, however, to corresponding structures on which a layer of ceramic facing material is desired.

Figure 1:
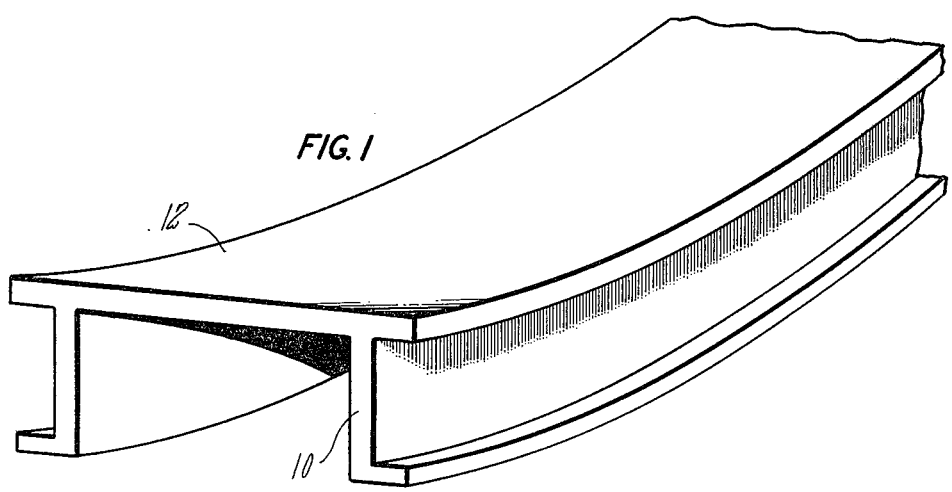
FIG. 1 is a simplified, perspective view of a solid metallic substrate of the type employed in the manufacture of an outer air seal.
Figure 2:
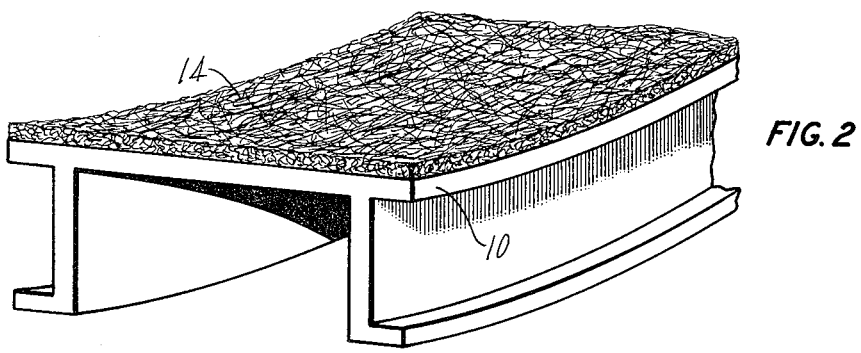
FIG. 2 illustrates the step of bonding a porous pad of uniform thickness to the substrate of FIG. 1.
Figure 3:
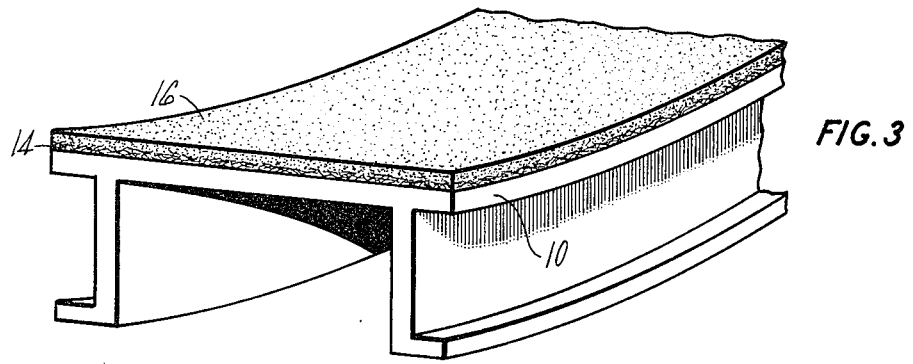
FIG. 3 illustrates the step of impregnating the porous pad of FIG. 2 with an MCrAlY underlayment material.
Figure 4:
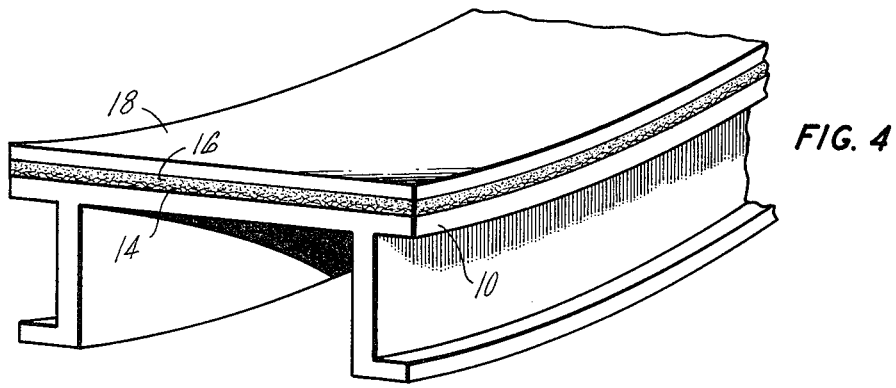
FIG. 4 illustrates the step of applying a ceramic facing material to the impregnated porous pad of FIG. 3.

A solid metal substrate 10 is illustrated in FIG. 1. The substrate has an arcuate surface 12 which is formed to the general contour of ceramic facing material desired on the completed part. In FIG. 2 a porous metallic pad 14 of material having a low modulus of elasticity, such as the wire mesh pad illustrated, is joined to the metal substrate. In FIG. 3 the low modulus pad has been impregnated with an underlayment 16 of coating of an alloy containing chromium and aluminum and at least one element selected from the group of iron, cobalt and nickel. Optionally, the alloy may contain one or more elements selected from the group of yttrium and the rare earth elements. Such alloys containing yttrium are known within the industry as "MCrAlY" materials wherein the designation "M" stands for at least one of the elements from the iron, cobalt and nickel group. In FIG. 4 a ceramic facing material 18 has been applied over the underlayment coating.

In one embodiment, that of the outer air seal structure illustrated by FIGS. 1–4, the porous pad was formed of an iron base alloy wire (FeCrAlY) having a diameter of five to six thousandths of an inch (0.005–0.006 in.). The pad was compressed to a density of thirty-five percent (35%) wire material and sintered to establish at least a partial metallurgical bond between adjacent wires. A finished pad thickness of sixty thousandths of an inch (0.060 in.) was employed. Pad thicknesses within the range of thirty to two hundred thousandths of an inch (0.030–0.200 in.) are thought to be preferred for most applications. Lesser thicknesses may not adequately accommodate thermal expansion; greater thicknesses may not provide a sufficiently rigid structure. The pad was brazed to the substrate by conventional techniques and the bond was found to be effective.

In that structure an underlayment coating of NiCrAlY alloy material consisting of 14–20 wt. % chromium;
11–13 wt. % aluminum;
0.10–0.70 wt. % yttrium;
2 wt. % maximum cobalt; and
balance nickel was employed. An equivalent depth of coating, that is the depth of coating if applied to a flat surface, of approximately five thousandths of an inch (0.005 in.) was deposited into the wire pad. Equivalent depths of coating within the range of four to ten thousandths of an inch (0.004–0.010 in.) are thought to be preferred in most applications. Lesser depths may not deposit sufficient underlayment for the subsequently deposited ceramic to adhere; greater depths may completely fill the voids between wires thereby leaving an insufficiently irregular surface for the ceramic to adhere. Other suitable underlayment materials are thought to include the nickel cobalt base alloy "NiCoCrAlY", the cobalt base alloy "CoCrAlY", and the iron base alloy "FeCrAlY".

The effective application of underlayment material is critical to the concepts described herein. The underlayment must penetrate well into the wire pad and securely adhere to the wires. One suitable application technique is disclosed in co-pending patent application Ser. No. 13,944, filed Feb. 22, 1979. In that technique underlayment particles are plasticized in a plasma stream and are accelerated in the stream to velocities on the order of four thousand feet per second (4000 fps). The high velocity enables the particles to penetrate well into the porous wire pad. Collaterally, the temperature of the effluent in the described plasma spray process is substantially lower than that employed in conventional plasma spray processes. The reduced temperatures employed prevent overheating of the wire fibers in the pad such that the wires are not oxidized before acceptable coatings can be deposited. Wire temperatures of less than one thousand degrees Fahrenheit (1000° F.) for FeCrAlY wires are generally required to assure that oxidation of the wires does not occur. Fiber temperatures restricted to a range of eight hundred to nine hundred degrees Fahrenheit (800°–900° F.) are preferred.

Figure 7A:
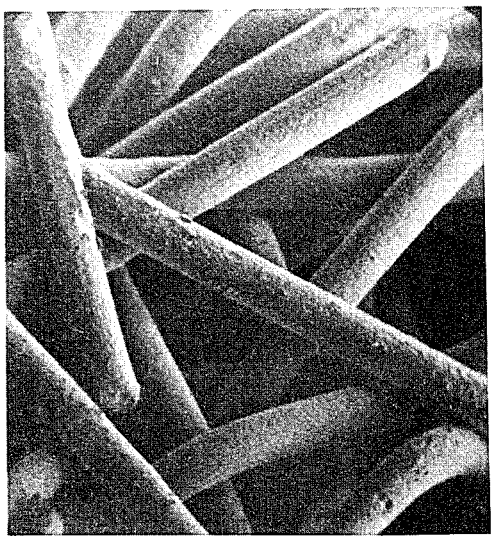
FIGS. 7a and 7b are photographs of a wire pad before application of the MCrAlY underlayment material.
Figure 7B:
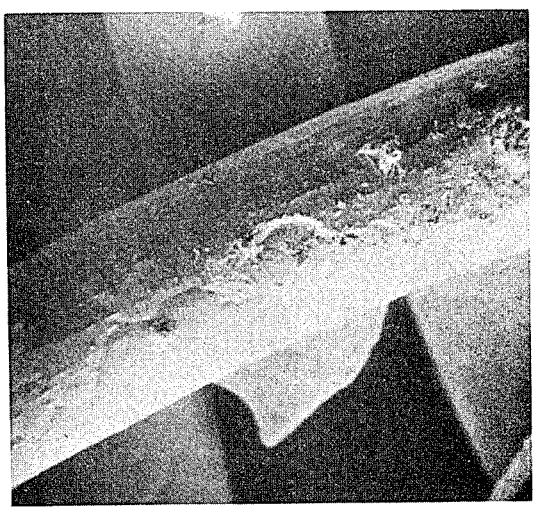
Figure 8A:
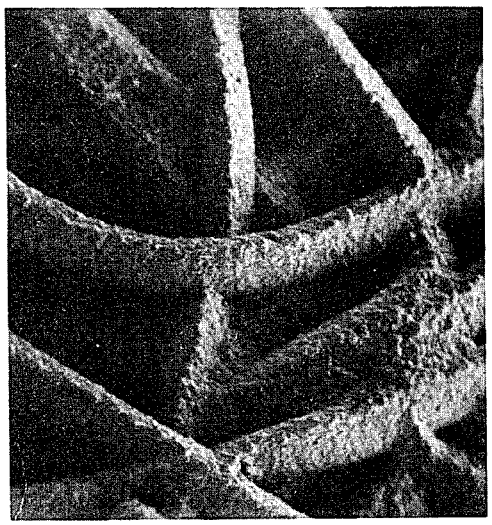
FIGS. 8a and 8b are photographs showing the wire pad of FIG. 7 after the wire pad has been coated with underlayment material.
Figure 8B:
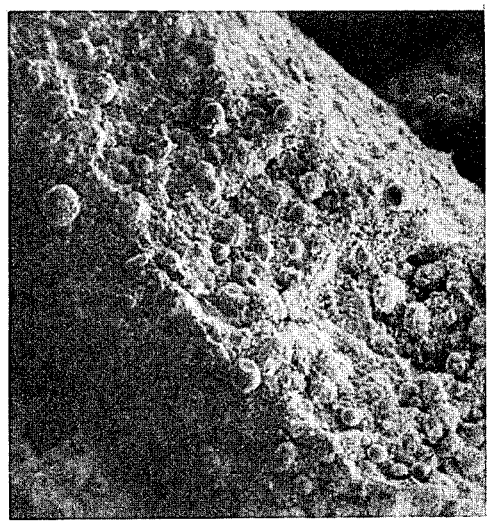

FIGS. 7A and 7B illustrate a wire pad formed of five thousandths to six thousandths of an inch (0.005–0.006 in.) diameter wires. The wire pad is formed to a wire density of thirty-five percent (35%) prior to the application of the MCrAlY underlayment coating. The photographs show the coating as seen with a scanning electron microscope at fifty times size and at two hundred times size. The individual wires have a relatively smooth surface texture. FIGS. 8A and 8B illustrate a wire pad of the same gauge and porosity as the pad illustrated in FIGS. 7A and 7B. The pad of FIG. 8, however, has been impregnated with an MCrAlY underlayment material. The surfaces of the wires are significantly roughened. The deposited underlayment has good adherence to the wire and provides an ideal surface for receiving the ceramic layer. The high velocity, plasma spray process for depositing the MCrAlY material causes the MCrAlY underlayment to penetrate well into the wire pad. The reduced plasma temperature process used in the application of the underlayment makes oxidation of the wires prior to the establishment of a good coating bond unlikely.

In the structure a ceramic material of zirconium oxide stabilized with yttrium oxide consisting nominally of
80 wt. % zirconium oxide ($ZrO_2$); and
20 wt. % yttrium oxide ($Y_2O_3$)
was deposited to an equivalent depth of sixty thousandths of an inch (0.060 in.). Depths within the range of twenty to one hundred thousandths of an inch (0.020–0.100 in.) are considered easily workable, and even greater depths may be attained. Unalloyed powders of zirconium oxide and yttrium oxide were applied at conventional plasma spray velocities of eight hundred to twelve hundred feet per second (800–1200 fps). Pre-alloyed ceramic powders may, however, produce even more effective structures. Other ceramic compositions known in the industry are likely to provide predictable structures well suited to similar applications.

Figure 5:
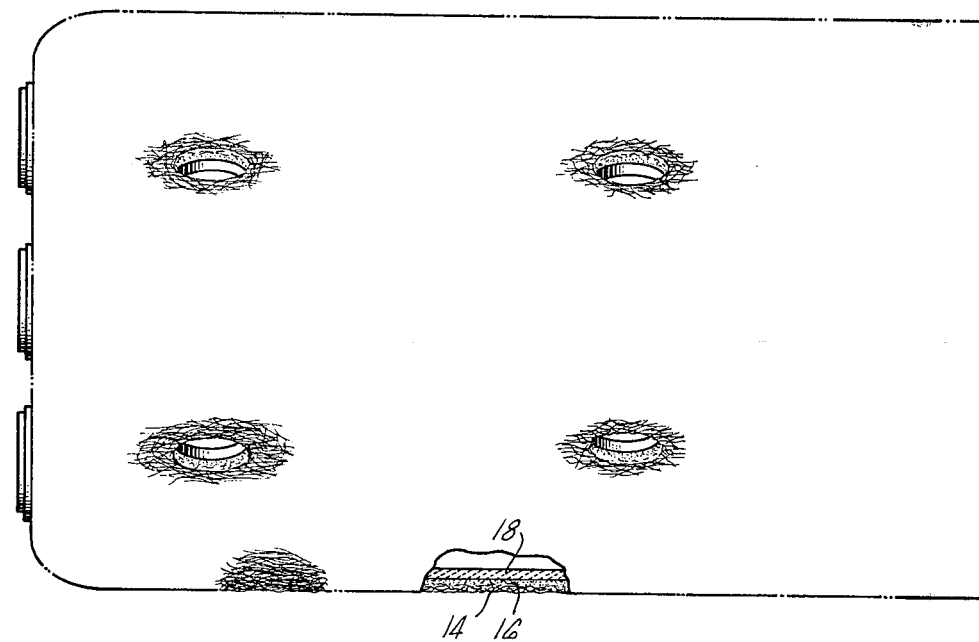
FIG. 5 illustrates the application of the present concepts to a ceramic, combustion chamber component.

FIG. 5 illustrates a combustion chamber component of a gas turbine engine which is manufactured in accordance with the concepts disclosed. In the combustion chamber illustrated, the wire pad is unsupported by a solid backing as was the case in the outer air seal described. The ceramic coating itself is deposited to a depth which will provide satisfactory rigidity to the combustion chamber structure. As is the case with the outer air seal described, the wire pad is first impregnated with MCrAlY material to enable the ceramic to adhere securely to the wire pad.

Figure 6:
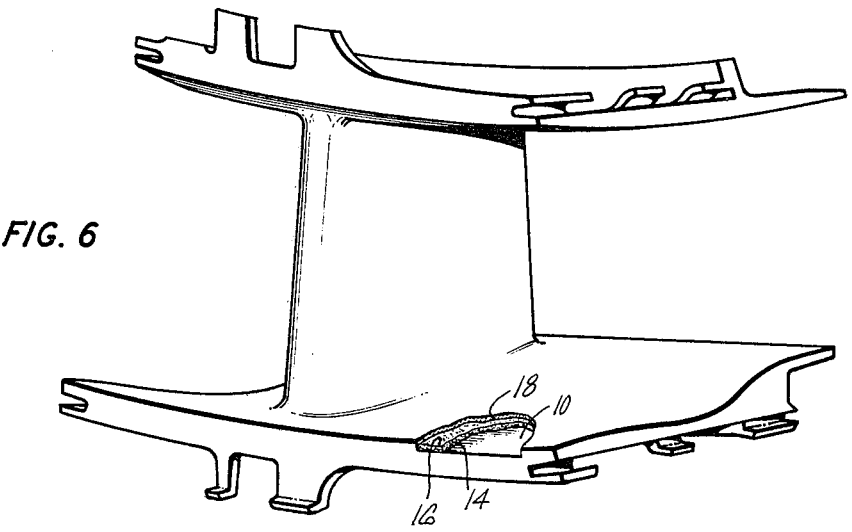
FIG. 6 illustrates the application of the concepts to a ceramic faced turbine airfoil.

FIG. 6 illustrates a turbine airfoil structure manufactured in accordance with the method taught. As is the case with the outer seal structure described, the ceramic facing material is deposited on a wire pad which has been first bonded to a solid metallic substrate and then impregnated with underlayment material. Airfoil structures formed around an impregnated pad without a solid metal substrate may also be fabricated.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of our invention, that which we claim as new and desire to secure by Letters Patent of the United States is:

1. A method for fabricating a ceramic faced article, comprising the steps of:
    forming a porous pad of metallic material to the general contour of the desired finished surface;
    impregnating the porous pad with an underlayment coating of MCrAlY type material at the contoured surface of the pad to provide a roughened surface including the application of said underlayment coating at coating particle velocities on the order of four thousand feet per second (4000 fps) to attain deep impregnation of the coating into the porous pad; and
    applying a ceramic material over the roughened surface of the pad to form the ceramic surfaced article.

2. The invention according to claim 1 wherein the step of impregnating the porous pad includes the application of MCrAlY underlayment material selected from the group consisting of nickel base alloy (NiCrAlY), cobalt base alloy (CoCrAlY), nickel cobalt base alloy (NiCoCrAlY), and iron base alloy (FeCrAlY).

3. The invention according to claim 2 wherein the step of impregnating the porous pad includes application of NiCrAlY material consisting essentially of
    14–20 wt. % chromium;
    11–13 wt. % aluminum;
    0.10–0.70 wt. % yttrium;
    2 wt. % maximum cobalt; and
    balance nickel.

4. The invention according to claim 3 wherein the step of impregnating the porous pad includes the application of an equivalent depth of material within the range of four to ten thousandths of an inch (0.004–0.010 in.).

5. The invention according to claim 4 wherein the step of impregnating the porous pad includes the application of an equivalent depth of material of approximately five thousandths of an inch (0.005 in.).

6. A method for fabricating a ceramic faced article, comprising the steps of:
    forming a metallic substrate to the general contour of the desired ceramic facing;
    bonding a porous metallic pad of nearly uniform thickness of the contoured substrate;
    impregnating the porous wire pad with an underlayment coating of MCrAlY type material to provide a roughened surface over the wires of the pad including the application of said underlayment coating at coating particle velocities on the order of four thousand feet per second (4000 fps) to attain deep impregnation of the coating into the porous pad; and
    applying a ceramic material ov.. the underlayment coating to form the ceramic faced article.

7. The invention according to claim 6 wherein the step of impregnating the porous pad includes the application of MCrAlY underlayment material selected from the group consisting of nickel base alloy (NiCrAlY), cobalt base alloy (CoCrAlY), nickel cobalt base alloy (NiCoCrAlY) and iron base alloy (FeCrAlY).

8. The invention according to claim 7 wherein the step of impregnating the porous pad includes application of NiCrAlY material consisting essentially of
    14–20 wt. % chromium;
    11–13 wt. % aluminum;
    0.10–0.70 wt. % yttrium;
    2 wt. % maximum cobalt; and
    balance nickel.

9. The invention according to claim 8 wherein the step of impregnating the porous pad includes the application of an equivalent depth of material within the range of four to ten thousandths of an inch (0.004–0.010 in.).

10. The invention according to claim 9 wherein the step of impregnating the porous pad includes the application of an equivalent depth of material of approximately five thousandths of an inch (0.005 in.).

11. A ceramic faced structure of the type suited for use in high temperature environments comprising:
- a porous pad of metallic material having a low modulus of elasticity which is formed to the general contour of the desired ceramic faced structure;
- an underlayment coating of MCrAlY type material having an equivalent depth of greater than five thousandths of an inch (0.005 in.) but less than ten thousandths of an inch (0.010 in.) which has been impregnated into the porous pad to provide a roughened surface for adherence of the ceramic;
- a ceramic material which has been applied over the underlayment coating to form the ceramic facing on the structure.

12. The invention according to claim 11 wherein the underlayment material is selected from the group consisting of nickel base alloy (NiCrAlY), cobalt base alloy (CoCrAlY), nickel cobalt base alloy (NiCoCrAlY), and iron base alloy (FeCrAlY).

13. The invention according to claim 12 wherein the underlayment material consists of a nickel base material (NiCrAlY) consisting essentially of
- 14–20 wt. % chromium;
- 11–13 wt. % aluminum;
- 0.10–0.70 wt. % yttrium;
- 2 wt. % maximum cobalt; and
- balance nickel.

14. The invention according to claim 11 wherein said underlayment coating has been deposited by a high velocity, plasma spray process in which the velocity of underlayment material approaching the pad is on the order of four thousand feet per second (4000 fps).

15. The invention according to claim 12 wherein said underlayment coating has been deposited by a high velocity, plasma spray process in which the velocity of underlayment material approaching the pad is on the order of four thousand feet per second (4000 fps).

16. The invention according to claim 13 wherein said underlayment coating has been deposited by a high velocity, plasma spray process in which the velocity of underlayment material approaching the pad is on the order of four thousand feet per second (4000 fps).

17. The invention according to claim 11, 12, 13, 14, 15 or 16 wherein the porous pad of metallic material has a material density of approximately thirty-five percent (35%).

18. The invention according to claim 17 wherein the porous pad is fabricated of wire.

19. The invention according to claim 18 wherein the diameter of the wire is approximately five thousandths of an inch (0.005 in.).

20. The invention according to claim 19 wherein the wire is fabricated of an iron based alloy (FeCrAlY).

21. The invention according to claim 18 wherein the wire is fabricated of an iron based alloy (FeCrAlY).

22. The invention according to claim 17 wherein the metallic material is fabricated of an iron based alloy (FeCrAlY).

23. The invention according to claim 11, 12, 13, 14, 15 or 16 wherein the ceramic consists principally of zirconium oxide and yttrium oxide.

24. The invention according to claim 23 wherein the ceramic material has a composition consisting essentially of 80 wt. % zirconium oxide ($ZrO_2$); and 20 wt. % yttrium oxide ($Y_2O_3$).

25. The invention according to claim 24 wherein the ceramic material has an equivalent depth within the range of twenty to one hundred thousandths of an inch (0.020–0.100 in.).

26. The invention according to claim 25 wherein the ceramic has an equivalent depth of sixty thousandths of an inch (0.060 in.).

27. The invention according to claim 23 wherein the ceramic material has an equivalent depth within the range of twenty to one hundred thousandths of an inch (0.020–0.100 in.).

28. The invention according to claim 27 wherein the ceramic has an equivalent depth of sixty thousandths of an inch (0.060 in.).

* * * * *